Nov. 21, 1961     B. BRUNNBERG     3,009,944
MANUFACTURE OF NITRIC ACID ESTERS OF ALIPHATIC ALCOHOLS
Filed Jan. 3, 1958
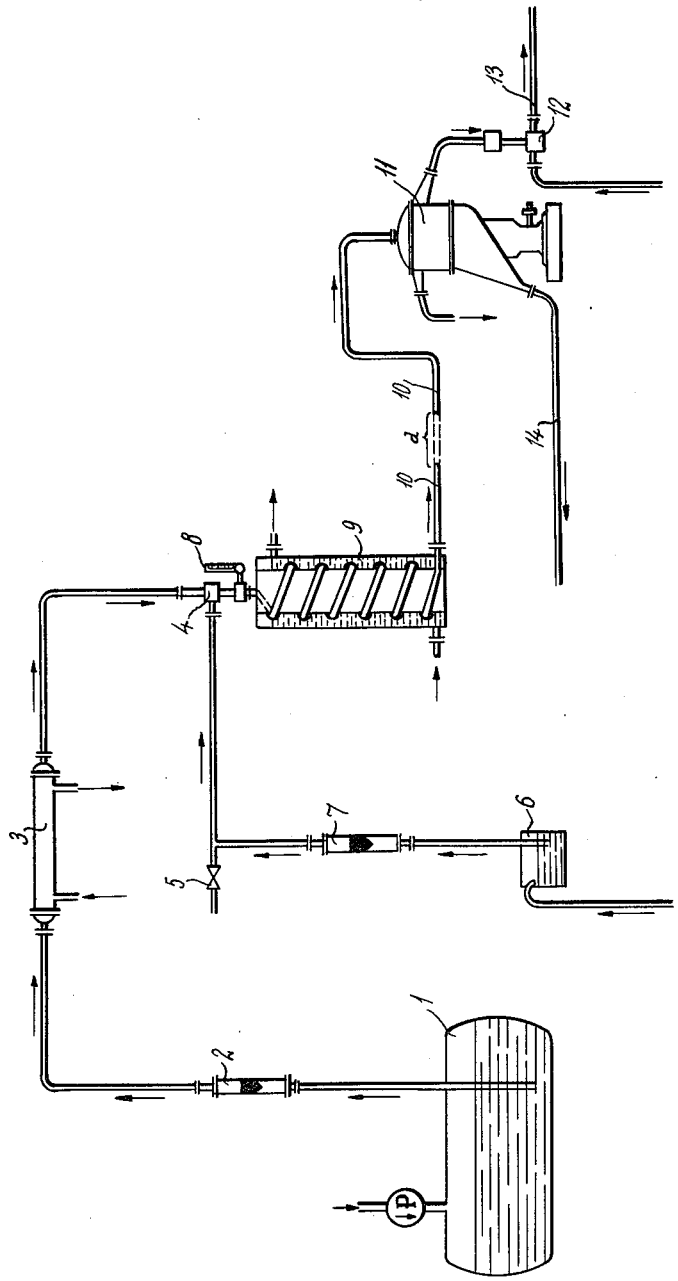
INVENTOR.
BERNT BRUNNBERG
BY
Parker + Philpitt
his attorneys

3,009,944
MANUFACTURE OF NITRIC ACID ESTERS OF ALIPHATIC ALCOHOLS

Bernt Brunnberg, Gyttorp, Sweden, assignor to Nitroglycerin Aktiebolaget, Gyttorp, Sweden, a corporation of Sweden
Filed Jan. 3, 1958, Ser. No. 706,940
14 Claims. (Cl. 260—467)

This invention concerns the manufacture of nitric acid esters of aliphatic alcohols by nitration with a nitrating acid. More particularly, the invention relates to a method for producing nitric acid esters of polyhydric aliphatic alcohols, such as glycerol, glycol and diglycol, by injector nitration.

In the customary continuous nitration systems hitherto employed for producing such nitric acid esters, the nitrating acid and the alcohol are introduced into the apparatus containing a relatively large buffer volume of spent acid in which the nitric acid ester produced by the reaction is emulsified. The apparatus is equipped with a powerful mechanical stirring device and cooling coils, and nitration is carried out at room temperature or below, while stirring effectively. Normally, in this apparatus, depending on its capacity 100–500 kg. are treated for about 15 minutes. From the nitrating apparatus continuously a volume of spent acid and nitrated product equal to the volume of the liquids supplied to the apparatus runs off over a discharge board to a separator. In this separator which contains no moving parts, the nitrated product rises and collects in the upper part of the separator where relatively large quantities of explosives are collected and from where it runs off to a washing system. Since washing, or at least partial washing, of the acid product normally takes place in the same room, this room will contain a considerable amount of explosive.

For a long time there has been a desire to reduce these quantities of explosive so that an explosion need no longer involve risk to human life and the destruction of buildings and apparatus.

For this purpose, recently a new method has been proposed in which nitration is carried out in an injector as described in the U.S. Patent No. 2,737,522 of March 6, 1956.

According to this method the nitrating acid is adjusted to a temperature suitable for the nitrating reaction and is then introduced under pressure into an injector in the form of a turbulent jet. the compound to be nitrated being drawn into the injector by suction by the vacuum produced therein by said jet, whereby the reaction components are intimately mixed practically instantly and the reaction takes place substantially completely immediately in the injector. The reaction mixture so obtained is then led down directly into a separator of conventional type provided with cooling coils, from which the acid nitrated product can run off, likewise in a conventional manner, and be conveyed to a washing system.

This method affords many important advantages over the earlier continuous processes among which especially may be mentioned a considerable reduction of the amount of charge present in the nitrating apparatus and a very short reaction time, but it also possess certain essential drawbacks in practical use, which it is the object of the present invention to eliminate.

Thus, in this injector nitration process an emulsion of spent acid and the nitric acid ester produced is obtained which is very easily separated. In fact, this feature is especially pointed out as an advantage, since the reaction mixture flows immediately from the injector into a separator, where it is desired to obtain as rapid a separation as possible. However, this property of the emulsion of being easily separated has for its consequence that the said emulsion cannot be conveyed to a separator installed at some distance from the nitrating house, in a separate building for example, since in such a case separation would take place already in the conduit and an explosive connection would be formed between the nitrating house and the separator house.

Furthermore, in said injector nitration process, the cooling produced in the separator will be ineffective, since the liquids in a separator of this type move very slowly. This disadvantage is especially pronounced due to the fact that the emulsion flowing down from the injector into the separator, owing to the high reaction temperature consistent with the injector nitrating process, will have a temperature which is about twice as high as is normally the case in the customary continuous nitrating apparatus.

Consequently, nothwithstanding the built-in cooling coils in the separator, there is a considerable risk that a heat development may occur at some point in the liquid mass in this separator which will spread further, causing complete decomposition of the nitric acid ester, or an explosion. Owing to the large quantity of explosive substance which collects at the top of the separator, both the apparatus and the building will be demolished and there will be danger to human life, if an explosion occurs. On this account, said nitration process, as described in the above-mentioned patent, must be carried out in a nitrating building of the conventional type comprising two floors with a waterfilled safety vessel on the lower floor into which the explosive liquid in the upper part of the separator can be discharged in the event of a risk of decomposition setting in.

The main object of the present invention is to eliminate the above-mentioned disadvantages of the said injector nitration process and to improve the same, so as to provide a method for manufacturing nitric acid esters of alcohols of the highest possible degree of safety in operation. A further object of the invention is to provide a method which can be carried out with apparatus and plants of simpler and cheaper construction than has previously been possible. These and other objects are accomplished as will appear from the following description of the invention.

The invention is based on the discovery that if a small quantity of a gas which is non-reactive under the prevailing reaction conditions, is sucked into the injector simultaneously with the alcohol, preferably together with the alcohol, this gas will have a favourable effect on the process in many respects, without giving rise to any disadvantages.

For example, this gas will promote the mixing of the alcohol with the nitrating acid, so that it takes place more rapidly and vigorously which is advantageous for the esterifying reaction and reduces the risk of side reactions at local points having a high temperature.

The most valuable effect obtained by the introduction of said small quantity of gas is, however, that the nitric acid ester and the spent acid are transferred into a very intimate liquid emulsion containing the gas in a very finely divided state which, without being separated, and therefore in a non-explosive condition can be conveyed over very long distances, in any case over 50 meters.

This is of great importance since it makes it possible to immediately discharge the said emulsion containing the reaction products from the nitrating room and pass it through a closed conduit to a centrifugal separator installed at a considerable distance from the nitration locality and surrounded by a concrete bunker or installed in a house surrounded with protecting walls where separation of the nitric acid ester from the spent acid takes place.

The quantity of gas required to achieve this favourable result is very small. It has been found that amounts of gas within the range of from about 5 to about 30% by volume (at room temperature), preferably within the range of about 12 to about 15%) by volume, based on the total volume of liquid supplied to the injector, are sufficient to give satisfactory results. As examples of such gases may be mentioned nitrogen, carbon dioxide and air. In practice, air is preferred since it is cheap and the use thereof is convenient and does not require any complicated arrangements, and when added in such a small quantity it does not give rise to any detrimental oxidation reactions.

It has been found that the gas containing emulsion obtained according to the invention can be cooled far more effectively than is the case in the previously mentioned separator with its almost stationary liquid mixture. In the present process, actually, an effective cooling can be applied immediately after the emulsion has left the injector on its way to the centrifugal separator which considerably reduces the risks of the high nitration temperature which, due to the absence of cooling in the nitration step, is inherent with the injector nitration method.

The use of a centrifugal separator in the injector nitration process according to the invention involves the great advantage over a separator of the static type that the separating effect is considerably greater, so that the quantity of nitric acid ester present in the separator at one time can be reduced to a minimum even with a high capacity of the separator. Moreover, this separator does not require direct supervision. The gas contained in the emulsion has no detrimental effect on the separating capacity of the machine. Explosive oil running off from the separator is passed into a washing injector and is by means of a washing liquid immediately converted to a new, non-explosive liquid emulsion, which is transferred in this form to a wash-and-weigh house for the explosive oil.

As will appear from the foregoing, one of the great advantages of the present method is that very small quantities of free nitroglycerine are present during the manufacturing proces. Throughout the nitration apparatus the explosive oil that is produced is emulsified vigorously with acid and dispersed gas, and this emulsion is not explosive. The nitration apparatus can therefore be erected behind a concrete wall in the charging house which need not be mounded. The separator is erected in a concrete bunker at a safe distance from the nitrating apparatus and contains only a comparatively small amount of explosive at one time, for example 4 to 5 kg. Should an explosion occur in the separator, it will be limited locally and cannot be propagated to the nitrating apparatus or to the wash-and-weigh house.

In view hereof, a separate nitration house of conventional construction, with safety tank, mounds, and the like, is unnecessary for this nitroglycerine production method.

In addition to the advantages already mentioned above, the supply of a small amount of gas into the injector according to the invention, offers a further very important advantage, inasmuch as over-dosage of alcohol can be entirely prevented.

In the previously mentioned injector nitration method, disturbances may occur owing to pressure variations in the acid supply conduit resulting in a varying vacuum in the injector. Thus, if the flow of acid decreases, alcohol may be drawn into the injector to equalize the vacuum without a corresponding quantity of acid flowing in at the same time which may result in a decomposition or even an explosion.

This disadvantage is obviated by the present invention. If the vacuum in the injector is adjusted down to a suitable value by supplying a small quantity of gas in the manner indicated, and the alcohol container is placed at a somewhat lower level than the injector, a very accurate and reliable regulation of the quantity of alcohol drawn into the injector is obtainable. The vacuum in the injector is adjusted in such a way that with the full supply of acid, the correct quantity of alcohol will be drawn in. If for some reason the flow of acid decreases, which results in a reduced suction effect, this will be further accentuated by the introduction of the gas, and the admission of alcohol will decrease proportionately more than corresponds to the reduction in the acid supply. In other words, over-dosage of alcohol in relation to the quantity of acid is practically impossible in this process. With a rapid slowing down in the supply of acid, which, in the event of a direct suction of alcohol without gas introduction, would involve considerable risks, there is no such risk in the present process, since the accompanying quantity of gas practically fills up the vacuum in the injector immediately and the alcohol flows down back to its supply container, whereby further nitration is rendered impossible.

It has previously been proposed in the production of nitroglycerine to supply the nitrating acid and the glycerol separately by means of a compressed air jet as the driving force into an injector (U.S. Patent No. 449,687). The compressed air is hereby supplied in such a large quantitity and at such a high pressure (about 7 atm.) that the alcohol and the acid are atomized and converted to a dispersion consisting of very fine drops distributed in a very large quantity of air, the said dispersion being conveyed through a long pipe to a collecting vessel and when flowing out to the latter it is sprayed with a jet of cold water.

It lies in the nature of things that in this process the content of the reaction components in the air dispersion will be very low, so that a chemical reaction between the liquid components will only take place to a very small extent. The large surplus of air further involves a considerable risk that oxidation reactions will occur and finally, disturbances in the supply of compressed air might easily give rise to an over-dosage of glycerol, with catastrophic consequences.

Distinguished therefrom, according to the invention, the nitrating acid serves as the driving force for supplying the alcohol and the gas to the injector, and the gas is only supplied in such a small quantity that it exercises an emulsifying effect and promotes the formation of a stable, non-explosive emulsion of the reaction mixture which is conveyed as such over a long distance to a centrifugal separator in which it is broken and separation of the nitric acid ester from the spent acid takes place.

When applying the method of the invention in practice, the nitrating acid is preferably prepared in a conventional manner by mixing fresh nitrating acid and spent acid in suitable proportions. A typical example of a fresh nitrating acid of normal composition is an acid containing about 55.5% $HNO_3$, 46.0% $H_2SO_4$, −1.5% $H_2O$ and as an example of the composition of spent acid may be mentioned an acid containing 11.5% $HNO_3$, 70.0% $H_2SO_4$, 15.5% $H_2O$ and 3% organic products. Fresh nitrating acid and spent acid are mixed in such proportions that the composition of the mixed acid may be within the ranges 15–45% $HNO_3$, 45–70% $H_2SO_4$, 5–15% $H_2O$ and 1–6% organic products.

Before introduction into the injector, which may preferably be of venturi-shaped type, the acid is adjusted to a temperature suitable for the nitrating reaction in question, said temperature naturally being dependent on the radio of fresh nitrating acid and spent acid in the mixed acid, i.e. the composition of the mixed acid. Generally, the temperature of the mixed acid may be adjusted to a value between −10° C. and +5° C. The rise of temperature in the nitrating step is also dependent on said ratio or the composition of the acid. For example, in the case of using a mixed acid consisting of fresh nitrating acid and spent acid of the compositions indicated above in the ratio of about 1:2, the rise of temperature in the nitrating step may be about 40° C. Consequently, in this case the reaction temperature in the nitrating apparatus (injector) will be within the range 30–45° C., dependent on the original temperature of the mixed acid as supplied.

In the case of using a mixed acid composed of the same component acids in the ratio of about 1:3 the rise of temperature in the nitrating step will be somewhat lower, namely about 33° C.

The pressure on the acid supplied to the injector may suitably be about 3–5 kg., and the vacuum in the injector is suitably regulated to a value of from about 150 to about 500 mm. Hg, preferably about 300–400 mm. Hg. The centrifugal separator used for the separation of the nitric acid ester may preferably be one of relatively high speed, for example with a speed of 2000–5000 r.p.m.

The method is more fully described below by way of a specific example with reference to the accompanying schematic drawing showing a nitration plant for carrying out the method. The data given here relate to the production of nitroglycerine with the use of air as the added gas, although the invention is by no means restricted hereto.

In the acid tank 1 a mixed acid is prepared from a nitrating acid and a spent acid approximately in the proportions 1:2, the composition of said mixed acid being as follows: $HNO_3$ 27–28%, $H_2SO_4$ 61%, $H_2O$ 9–10% and organic matter 2%. The tank is placed under an air pressure of about 3.5 kg. and the acid is forced through the measuring device (rotameter) 2 to a cooler 3 where it is cooled down to a temperature within the range 0° to +5° C., and is then passed to the vertically arranged injector 4. Instead of being placed under air pressure, the acid container may also be located at such a height that the acid is supplied to the injector by its own pressure. The glycerol container 6 is arranged at a lower level than the injector. By means of the needle valve 5 in the glycerol conduit the correct supply of air is regulated and a suitable vacuum is produced, in the present case 12–15% by volume of air (of room temperature) based on the total amount of liquid supplied to the injector, respectively a vacuum of ca. 300 mm. Hg. Preheated glycerol, or a mixture of glycerol and glycol, of about 50° C. can now be drawn up from the container 6, its supply being regulated by the measuring device (rotameter) 7, and is then mixed with the air from 5 and with the nitrating acid in the injector 4, whereby mixing of the components and reaction takes place instantaneously with formation of an air emulsified emulsion of the reaction mixture. The temperature is measured directly below the injector at 8, and the emulsion is cooled in the tubular cooler 9 immediately adjoining the injector. The time interval which elapses between the mixing of the liquids until their cooling begins only amounts to about ½ second. This first cooling from the nitrating temperature of about 46° C. to about 25° C. is effected with ordinary cold water. The cooling may then be suitably continued with a cooling liquid in another cooler (not shown in the drawing), which should be undertaken to obtain a satisfactory yield, as otherwise the spent acid may contain too large a quantity of dissolved nitroglycerine.

The injector, water cooler and a second (refrigerant) cooler for emulsion are erected behind a concrete wall in the operating room. During nitration this apparatus contains about 14 kg. of nitroglycerine vigorously emulsified in about 75 kg. of spent acid and in a continuous flow. This emulsion is not explosive and it cannot be made to explode directly nor propagate an explosion from the separator house.

The emulsion is transported through a closed conduit 10 with a slight slope to a centrifugal separator 11 running at a speed of about 3000 r.p.m. installed at a distance of about 20 meters (indicated in the drawing by $d$), which is placed in a concrete bunker. When producing 750 kg. of nitroglycerine per hour, the quantity of explosive substance in this separator will only amount to 5 kg. at the most. In view hereof, in the event of an explosion, the latter will be restricted to the apparatus installed in the separator building. The separated nitroglycerine running off from the separator is conveyed directly to a liquid-driven washing injector 12, and is then in the form of a new non-explosive liquid emulsion passed through the conduit 13 to a wash-and-weigh house for nitroglycerine. As washing liquids pure water, ammonia water, soda solution or the like may be employed. In the case of using an alkaline washing liquid cooling may be applied before the introduction of the same into the washing injector, so that no dangerous temperature rise occurs owing to the heat of neutralization which is developed. The spent acid from the separator runs through another conduit 14 to an acid compartment from where about ⅔ of this acid are re-introduced in the process, while the remainder is denitrated or treated in some other manner.

The yield of nitroglycerine obtained by this process corresponds to about 95% of the theoretical value.

As will be evident from the foregoing, the injector nitration method according to the invention is exceptionally safe and offers considerable advantages also in other respects. Large amounts of explosive are collected nowhere in the nitration plant. As indicated, the nitration apparatus, i.e., the injector, may be located behind a concrete wall and there is no need for the nitration workers to work in a room containing explosives at the nitration stage. There is no troublesome smell whatsoever from the nitroglycerine or the acid gases, and the process is completed without disturbing noise from motors or machines. The risk of addition of the wrong quantity of the alcohol, leading to decomposition or possibly explosion, is practically non-existent. Should an explosion occur in the separator, it will be limited locally and cannot be propagated to the nitrating apparatus or to the wash-and-weigh house.

Moreover, the invention also involves essential advantages from an economical point of view, since the erection of the apparatus and the building costs may be kept essentially lower than in the case of previously known plants for continuous nitration.

Although the method has been described above mainly in connection with the production of nitroglycerine, the invention is, as mentioned above, not restricted hereto, but may be applied also for the production of nitric acid esters of alcohols equivalent to those specifically mentioned.

In conclusion, while the foregoing specification describes preferred embodiments of this invention, it will be obvious to those skilled in the art that various changes and modifications may be made therein without departing from the basic principles and novel teachings of the invention, and it is therefore intended to cover all such changes, variations, modifications and equivalents falling within the scope of the appended claims and the true spirit and scope of the invention.

What I claim is:

1. In the manufacture of nitric acid esters of polyhydric alkanols by contacting the polyhydric alkanol with a ntrating acid, the improved process which comprises:

(a) introducing the nitrating acid under pressure in the form of a turbulent jet into a constricted elongated reaction zone, (b) utilizing the vacuum produced by said pressurized jet of nitrating acid to draw the polyhydric alkanol by suction into said elongated reaction zone, (c) also utilizing the vacuum produced by said pressurized jet of nitrating acid to concurrently draw a small amount of a non-reactive gas into said elongated reaction zone, (d) said small amount of non-reactive gas being within the range of from about 5% to about 30% by volume based on the volume of liquids supplied to said reaction zone, (e) said small amount of non-reactive gas being thoroughly dispersed within the resulting liquid reaction mixture by virtue of the suction effect produced by said pressurized turbulent jet of nitrating acid.

(f) said small amount of non-reactive gas being sufficiently dispersed so as to provide a stable non-explosive predominantly liquid emulsion capable of being transported over distances in excess of 50 meters without separation, and (g) immediately passing said emulsion from the nitration zone in a continuous stream directly to a centrifugal separating zone and there separating the nitric acid-alkanol ester so produced from the spent acid.

2. The process of claim 1 wherein said non-reactive gas is air.

3. The process of claim 2 wherein the amount of air is from about 12 to about 15% by volume, based on the volume of the liquids supplied to the reaction zone.

4. The process of claim 3 wherein part of the spent acid is recycled to be mixed with the nitrating acid and reintroduced into the process.

5. The process of claim 3 wherein said constricted reaction zone is the venturi-chamber of an injector.

6. The process of claim 3 wherein heat content of the nitrating acid is adjusted to a temperature within the range of about $-10°$ C. to about $+5°$ C.

7. The process of claim 3 wherein the separation of the nitric acid alkanol ester takes place in a centrifugal separating zone operating at a speed of from 2000 to about 5000 r.p.m.

8. The process of claim 3 wherein the nitric acid alkanol ester discharged from the centrifugal separating zone is delivered to a washing zone where it is immediately converted to a new, non-explosive liquid emulsion.

9. The process of claim 1 wherein the said nitrating acid is prepared by mixing fresh nitrating acid and spent nitrating acid in such proportions that the composition will be within the range of about 15–45% $HNO_3$, 45–70% $H_2SO_4$, 5–15% $H_2O$ and 1–6% organic products.

10. The process of claim 6 wherein the said nitrating acid is prepared by mixing fresh nitrating acid and spent nitrating acid in such proportions that the composition will be within the range of about 15–45% $HNO_3$, 45–70% $H_2SO_4$, 5–15% $H_2O$ and 1–6% organic products.

11. The process of claim 10 wherein said emulsion is passed through at least one cooling zone prior to being passed to said cenrtifugal separating zone.

12. The process of claim 11 wherein said alkanol is glycerol.

13. The process of claim 3 wherein said polyhydric alkanol is sucked upwardly against the force of gravity from a supply zone located at a lower level than said reaction zone by the vacuum produced by said pressurized jet of nitrating acid, whereby any reduction of the stream of nitrating acid or any increase in the amount of non-reactive gas sucked into the said pressurized jet of nitrating acid will automatically reduce the intake of polyhydric alkanol.

14. The process of claim 13 wherein the alkanol is glycerol and the emulsion is passed to a cenrtifugal separating zone operating at a speed of from about 2000 to about 5000 r.p.m. so as to separate the nitroglycerine so produced from the spent acid.

References Cited in the file of this patent

UNITED STATES PATENTS

| | | |
|---|---|---|
| 449,687 | Maxim | Apr. 7, 1891 |
| 2,717,903 | Ruth | Sept. 13, 1955 |
| 2,737,522 | Nilsson | Mar. 6, 1956 |